US011372239B1

(12) United States Patent
Sulai et al.

(10) Patent No.: US 11,372,239 B1
(45) Date of Patent: Jun. 28, 2022

(54) ENABLING EYE TRACKING IN PANCAKE LENS OPTICS

(71) Applicant: Facebook Technologies, LLC, Menlo Park, CA (US)

(72) Inventors: Yusufu Njoni Bamaxam Sulai, Bothell, WA (US); Wai Sze Tiffany Lam, Redmond, WA (US); Fenglin Peng, Kirland, WA (US); Jacques Gollier, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 862 days.

(21) Appl. No.: 16/178,177

(22) Filed: Nov. 1, 2018

(51) Int. Cl.
*G02B 5/30* (2006.01)
*G02B 27/00* (2006.01)
*G02B 17/00* (2006.01)

(52) U.S. Cl.
CPC ....... *G02B 27/0018* (2013.01); *G02B 5/3083* (2013.01); *G02B 17/004* (2013.01); *G02B 27/0093* (2013.01)

(58) Field of Classification Search
CPC ............... G02B 5/3083; G02B 17/004; G02B 27/0018; G02B 27/0093
USPC ....................................... 359/485.01, 489.07
See application file for complete search history.

(56) References Cited

U.S. PATENT DOCUMENTS

| | | | |
|---|---|---|---|
| 3,406,681 A * | 10/1968 | Zandman | A61B 3/16 600/398 |
| 4,526,442 A | 7/1985 | Betensky et al. | |
| 5,541,745 A | 7/1996 | Fergason | |
| 5,715,023 A | 2/1998 | Hoppe | |
| 5,966,242 A | 10/1999 | Yamanaka | |
| 6,055,053 A * | 4/2000 | Lesniak | G01L 1/241 356/34 |
| 6,266,194 B1 | 7/2001 | Tanijiri et al. | |
| 6,271,969 B1 | 8/2001 | Mertz | |
| 6,400,493 B1 | 6/2002 | Mertz et al. | |
| 6,421,183 B1 | 7/2002 | Ophey | |
| 6,710,928 B2 | 3/2004 | Roest | |
| 7,206,134 B2 | 4/2007 | Weissman et al. | |
| 7,570,427 B2 | 8/2009 | Hasman | |
| 8,009,349 B2 | 8/2011 | McDowall | |
| 9,372,128 B1 * | 6/2016 | Kneezel | B41J 15/16 |
| 9,555,589 B1 | 1/2017 | Ambur et al. | |
| 9,829,616 B2 | 11/2017 | Yun et al. | |
| 9,898,091 B2 | 2/2018 | Bristol et al. | |
| 9,977,246 B2 | 5/2018 | Ouderkirk et al. | |
| 10,025,060 B2 | 7/2018 | Lanman et al. | |
| 10,197,802 B2 | 2/2019 | Hoppe | |
| 10,394,040 B2 | 8/2019 | Gollier et al. | |
| 10,416,461 B2 | 9/2019 | Gollier et al. | |
| 10,429,656 B1 | 10/2019 | Sharma et al. | |

(Continued)

OTHER PUBLICATIONS

U.S. Office Action dated Feb. 28, 2020 in U.S. Appl. No. 16/104,453.

(Continued)

*Primary Examiner* — Ricky D Shafer
(74) *Attorney, Agent, or Firm* — Weaver Austin Villeneuve & Sampson LLP

(57) ABSTRACT

Ghost images can interfere with eye tracking in a system that uses folded optics, such as is an artificial-reality display. Optical elements, such as waveplates and/or polarizers, can be used to attenuate or eliminate light causing the ghost images.

16 Claims, 9 Drawing Sheets

(56) References Cited

U.S. PATENT DOCUMENTS

| | | |
|---|---|---|
| 10,429,657 B1 | 10/2019 | Sharma et al. |
| 10,429,927 B1 | 10/2019 | Sharma et al. |
| 10,571,692 B2 * | 2/2020 | Geng ................. G02B 27/0172 |
| 10,845,606 B1 * | 11/2020 | Sharma ................ G02B 27/286 |
| 2005/0111101 A1 | 5/2005 | Dike |
| 2006/0232862 A1 | 10/2006 | Steven et al. |
| 2007/0273970 A1 | 11/2007 | Hoppe et al. |
| 2009/0290079 A1 | 11/2009 | Evans et al. |
| 2010/0177113 A1 | 7/2010 | Gay et al. |
| 2011/0193814 A1 | 8/2011 | Gay et al. |
| 2015/0103151 A1 | 4/2015 | Carls et al. |
| 2016/0210782 A1 | 7/2016 | Thomas |
| 2017/0227770 A1 | 8/2017 | Carollo et al. |
| 2017/0276912 A1 | 9/2017 | Yao et al. |
| 2018/0039052 A1 | 2/2018 | Khan et al. |
| 2018/0113310 A1 | 4/2018 | Rolland et al. |
| 2018/0120579 A1 | 5/2018 | Gollier et al. |
| 2018/0239146 A1 * | 8/2018 | Bierhuizen ............. G06F 3/013 |
| 2019/0243147 A1 | 8/2019 | Smithwick et al. |
| 2019/0384070 A1 | 12/2019 | Geng et al. |
| 2020/0073123 A1 * | 3/2020 | Martinez ............. G02B 27/288 |
| 2020/0284963 A1 | 9/2020 | Yun et al. |

OTHER PUBLICATIONS

Notice of Allowance dated Sep. 2, 2020 in U.S. Appl. No. 16/104,453.
Notice of Allowance dated Feb. 3, 2021 in U.S. Appl. No. 16/104,453.
Restriction Requirement dated Apr. 17, 2020 in U.S. Appl. No. 15/946,685.
U.S. Office Action dated Jun. 17, 2020 in U.S. Appl. No. 15/946,685.
Final Office Action dated Dec. 15, 2020 in U.S. Appl. No. 15/946,685.

* cited by examiner

ENABLING EYE TRACKING IN PANCAKE LENS OPTICS

BACKGROUND

Artificial reality is a form of reality that has been adjusted in some manner before presentation to a user, which may include, e.g., virtual reality (VR), augmented reality (AR), mixed reality (MR), hybrid reality, or some combination and/or derivatives thereof. In a virtual reality (VR) system, a near eye display panel can be configured to present virtual reality images that depict objects in a virtual environment. The display panel may combine real objects with virtual objects, as in AR or MR applications.

BRIEF DESCRIPTION OF THE DRAWINGS

Illustrative embodiments are described with reference to the following figures.

Figure 1:
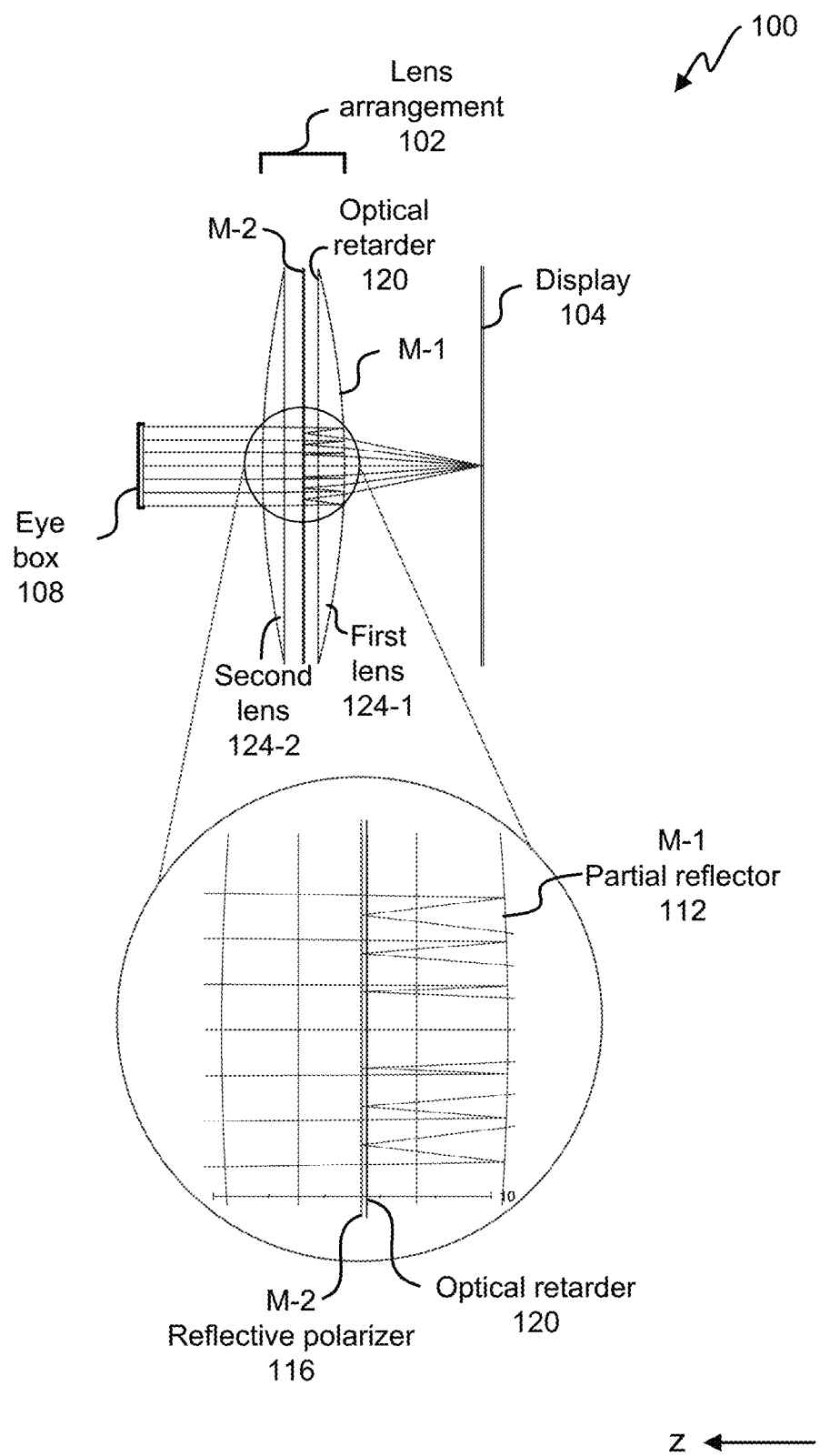
FIG. 1 illustrates a ray tracing diagram of an embodiment of an artificial-reality display with a lens arrangement for a pancake lens.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

The present disclosure relates generally to folded optics. More specifically, and without limitation, this disclosure relates to eye tracking in a head-mounted display while using a pancake lens. A pancake lens is a lens or lens system that uses mirrors to fold an optical path. In some virtual-reality (VR) systems, in which a pancake lens isn't used, a hot mirror (an optical element that transmits visible light and reflects infrared light) is used to gather reflected light from an eye for eye tracking. To reduce volume of a head-mounted display, a pancake lens is used in an artificial-reality display. In some configurations, a pancake lens comprises a partial mirror, a quarter-wave plate, and a reflective polarizer. A pancake lens has more surfaces, which can cause one or more ghost images imaged by a camera used for eye tracking.

There are several possible solutions to reduce ghost images for eye tracking while using a pancake lens. A first solution is to use a dielectric coating for the partial mirror of the pancake lens, which does not reflect in infrared. A second solution is to use a reflector having a narrow band circular reflective polarizer (e.g., a cholesteric liquid crystal). A third solution is to add, in addition to the pancake lens, a first quarter-wave plate, a second quarter-wave plate, and a linear polarizer (e.g., an absorptive linear polarizer). The first quarter-wave plate is placed between the partial mirror of the pancake lens and a hot mirror. The second quarter-wave plate is placed between the hot mirror and a camera used for eye tracking. The linear polarizer is placed between the second quarter-wave plate and the camera. In some embodiments, a third quarter-wave plate is placed between the linear polarizer and the camera to reduce reflections off a lens of the camera (e.g., a fast axis of the third quarter-wave plate is at 45 degrees to the transmission axis of the linear polarizer).

FIG. 1 illustrates a ray tracing diagram of an embodiment of an artificial-reality display 100 (e.g., for a virtual-reality system) with a lens arrangement 102. The lens arrangement 102 is sometimes referred to as a pancake lens. Light from a display 104 is transmitted through the lens arrangement 102 to an eye box 108. The lens arrangement 102 expands image light from the display 104. The lens arrangement 102 comprises a first mirror M-1 and a second mirror M-2. The first mirror M-1 and the second mirror M-2 fold light onto itself. The first mirror M-1 is a partial reflector 112. The partial reflector 112 has a transmission T, wherein T is equal to or greater than 20% or 40% and equal to or less than 60% or 80% (e.g., the partial reflector 112 is a 50/50 mirror with T=50%+/−2, 5, or 10%). The first mirror M-1 is on a curved surface of a lens (e.g., for focusing light from the display to an eye of a user). The second mirror M-2 is a reflective polarizer 116 (e.g., a linear, reflective polarizer). The lens arrangement 102 can also comprise an optical retarder 120. The optical retarder 120 (e.g., a quarter-wave plate) is between the first mirror M-1 and the second mirror M-2. Light emitted from the display 104 is transmitted by the partial reflector 112, the first mirror M-1 (e.g., half the light is transmitted through the partial reflector 112); reflected off the second mirror M-2; passed back to toward the first mirror M-1; reflected by the first mirror M-1; and then transmitted through the reflective polarizer 116, the second mirror M-2, to the eye box 108. An eye of the user is positioned at the eye box 108. By folding an optical bath onto itself, a form factor of the artificial-reality display 100 can be reduced (e.g., a distance between the display 104 and the eye box 108 can be reduced in the z dimension.

The first mirror M-1 can be part of a first lens 124-1. In some configurations, the lens arrangement 102 comprises a second lens 124-2. The first lens 124-1 and/or the second lens 124-2 are configured to focus light to the eye box 108. In some embodiments, the reflective polarizer 116 is part of the second lens 124-2.

Figure 2:
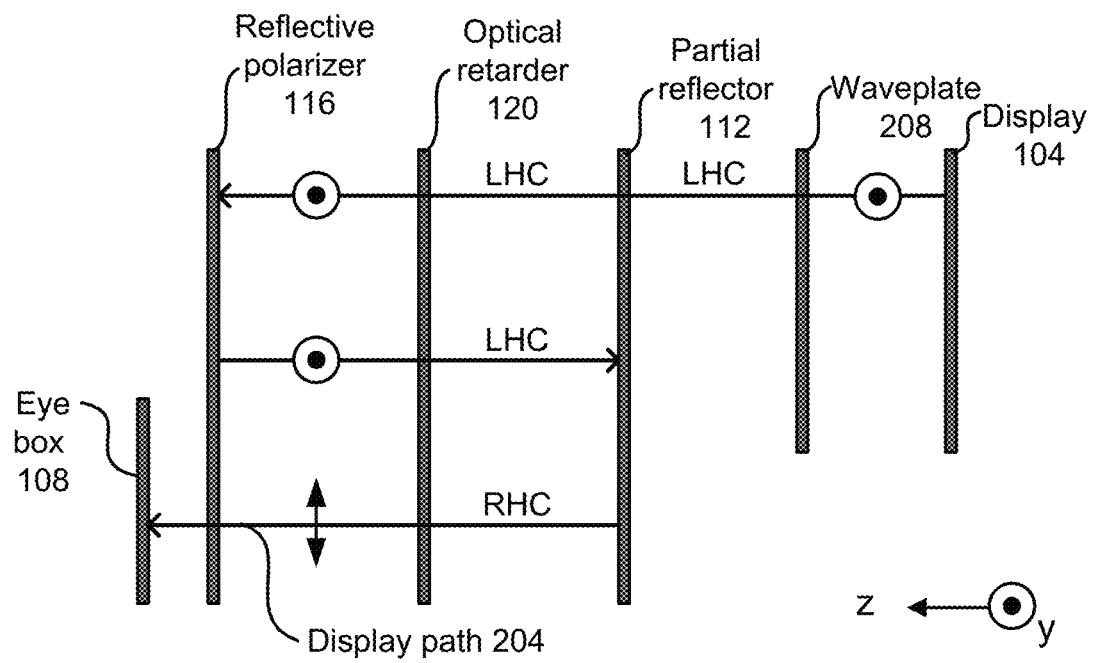
FIG. 2 depicts a schematic of an optical path of an embodiment of the lens arrangement.
Figure 3:
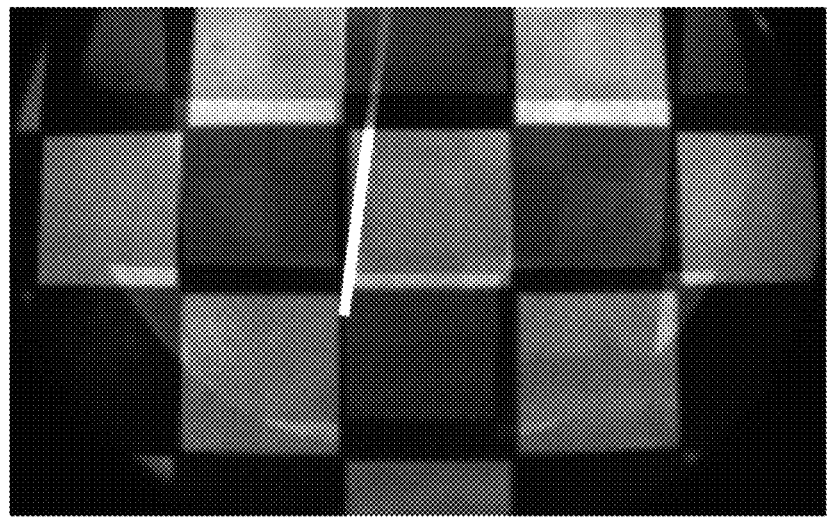
FIG. 3 is a picture of ghost images from a camera used for eye tracking with the lens arrangement.

FIG. 2 depicts a schematic of a display path 204 of an embodiment of an artificial-reality display with a lens arrangement 102. The display path 204 is an optical path of light transmitted from the display 104 to the eye box 108. FIG. 2 depicts polarization of light along the display path 204. The optical path is along the z-axis. The x-axis is not shown because the schematic in FIG. 3 is for describing light polarization as light bounces in the lens arrangement 102 and is not meant to show a change along the x axis.

The display 104 emits light. Light from the display 104 is transmitted to the partial reflector 112. Light between the display 104 and the partial reflector 112 is left-handed, circularly-polarized (LHC) light. Light between the display 104 and the partial reflector 112 could be left-handed, circularly-polarized light because light could be emitted from the display 104 as left-handed, circularly-polarized light, or light from the display 104 could be linearly polarized and changed to circularly-polarized light by a waveplate 208. A waveplate, sometimes also referred to as a retarder, is an optical element that changes polarization of light traveling through the optical element. The waveplate 208 could be a quarter-wave plate with a fast axis oriented at 45 degrees with respect the x-axis. Light linearly polarized along the x-axis, or horizontally polarized, is sometimes referred to as p-polarized light. Light linearly polarized along the y-axis, or vertically polarized, is sometimes referred to as s-polarized light.

Some of the light from the display 104 is transmitted through the partial reflector 112. In some embodiments, the partial reflector 112 has a transmission of 50% and reflectance of 50% (e.g., the partial reflector 112 has transmission of 50%+/−2, 5, 10, or 15%). Thus 50% of the light from the display 104 is reflected by the partial reflector 112, and lost.

Light transmitted by the partial reflector 112 is left-handed, circularly-polarized light and is transmitted to the optical retarder 120. The optical retarder 120 has a fast axis oriented at 135 degrees with respect to the x-axis. Left-handed, circularly-polarized light passing through the optical retarder 120 in a positive z-direction will be changed to s-polarized light.

The reflective polarizer 116 has a transmission axis aligned with the x-axis (which passes p-polarized light). Thus s-polarized light will be reflected from the reflective polarizer 116 and pass through the optical retarder 120 in a negative z-direction. S-polarized light passing through the optical retarder 120 in the negative z-direction will be changed to left-handed, circularly-polarized light. After passing through the optical retarder 120 a second time, and traveling in the negative z-direction, light will reflect from the partial reflector 112 (and 50% will be transmitted in the negative z-direction and be lost; thus a total of 75% of light from the display 104 is lost by using the partial reflector 112).

Light that is left-handed, circularly-polarized light traveling in the negative z-direction will be reflected from the partial reflector 112 as right-handed, circularly-polarized (RHC) light propagating in the positive z-direction. The right-handed, circularly-polarized light reflected from the partial reflector 112 passes through the optical retarder 120, a third time (a second time in the positive z-direction), and is converted to p-polarized light. P-polarized light from the optical retarder 120 is passed by the reflective polarizer 116 because the reflective polarizer 116 passes p-polarized light. Passed light from the reflective polarizer 116 is transmitted to the eye box 108.

FIG. 3 is a picture of ghost images from a camera used for eye tracking with a lens arrangement 102 having a first mirror M-1 and a second mirror M-2. The picture is of black and white squares. The camera is configured to track a position of an eye of a user of the artificial-reality system. The first mirror M-1 and/or the second mirror M-2 provide reflections that produce ghost images for the camera. Light traveling along an optical path that produces a ghost image follows what is called a ghost path. Light following a ghost path produces an image that can interfere with an image of the eye, which interfere with tracking the eye.

Figure 4:
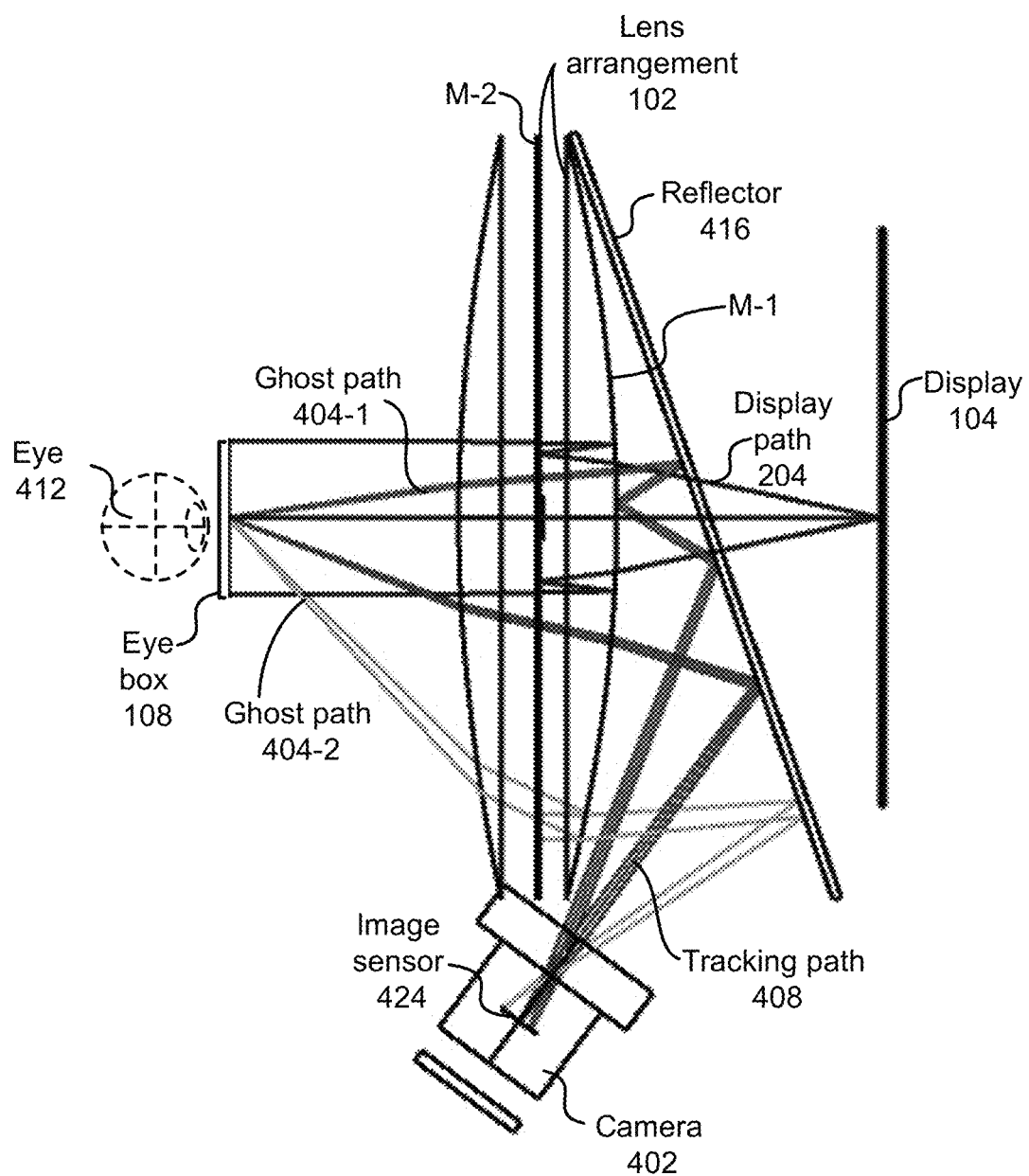
FIG. 4 illustrates a ray tracing diagram of an embodiment of a camera used for eye tracking with the lens arrangement.

FIG. 4 illustrates a ray tracing diagram of an embodiment of an artificial-reality system having a camera 402 used for eye tracking with the lens arrangement 102. Embodiments of ghost paths 404 and a display path 204 are shown. Also shown is an embodiment of a tracking path 408. The tracking path 408 is an optical path of light used for imaging an eye 412 of a user. Light traveling along the tracking path 408 travels from the eye 412, through the lens arrangement, and directed by a reflector 416 to the camera 402. The camera 402 comprises an image sensor 424. The image sensor 424 acquires images of the eye.

For eye tracking in a system without the lens arrangement 102, the reflector 416 can be a hot mirror. A hot mirror is a mirror that reflects light of longer wavelengths (e.g., infrared light) and passes light of shorter wavelengths (e.g., visible light). If a hot mirror is used as the reflector 416 with the lens arrangement 102, light is able to bounce between the reflector 416 and the first mirror M-1 (e.g., a first ghost path 404-1); and/or light is able to bounce between the first mirror M-1 and the second mirror M-2 (a second ghost path 404-2).

Figure 5:
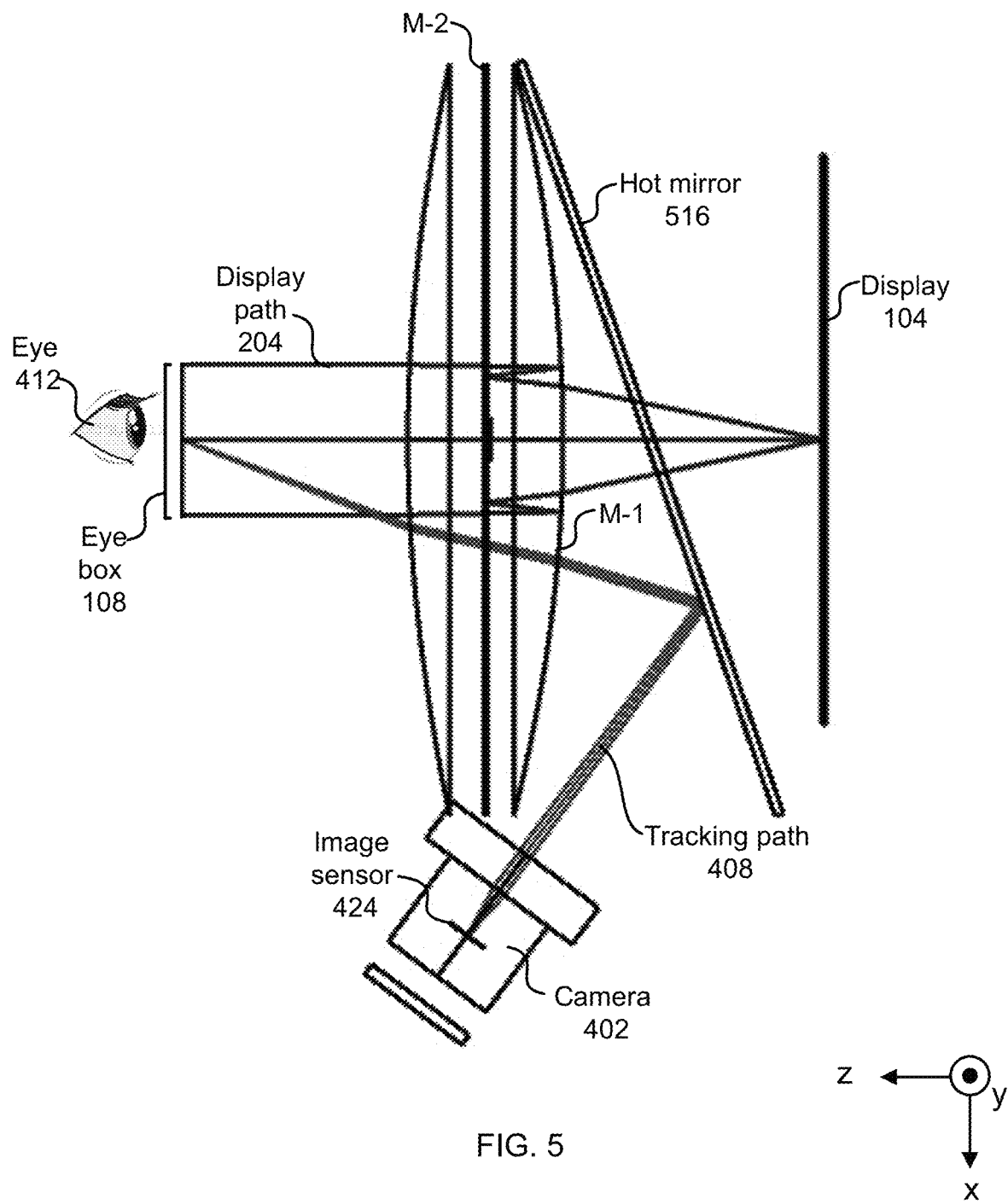
FIG. 5 illustrates a ray tracing diagram of an embodiment of a partial mirror with a dielectric coating.

One possible solution to reduce ghost images is to use have the first mirror M-1 be a cold mirror. FIG. 5 illustrates a ray tracing diagram of an embodiment of the first mirror M-1 having a dielectric coating. The dielectric coating is used to have the first mirror M-1 be a cold mirror. The cold mirror passes light of longer wavelengths (e.g., infrared) and reflects light of shorter wavelengths (e.g., visible light). Thus the first mirror M-1 could have a reflectance of 50%, +/−5% for light having a wavelength equal to or less than 750 nm (and/or equal to or greater than 450 nm); and the cold mirror could have a reflectance of less than 1%, 5% or 10% for light having a wavelength equal to or greater than 800 nm (and/or equal to or less than 2.5 microns). The image sensor 424 images light equal to or greater than 800 nm and/or equal to or less than 2.5 microns. Thus the first mirror M-1 in FIG. 5 will not cause ghost images by spurious reflections.

The reflector 416 is a hot mirror 516. The dielectric coating prevents light from transmitting along the first ghost path 404-1 to reach the camera 402 because light from the eye 412 of a user, reflecting off the hot mirror 516 would not be reflected from first mirror M-1 back toward the hot mirror 516. The dielectric coating prevents the second ghost path 404-2 because infrared light reflected from the eye is not reflected by the first mirror M-1 back toward the second mirror M-2.

Figure 6:
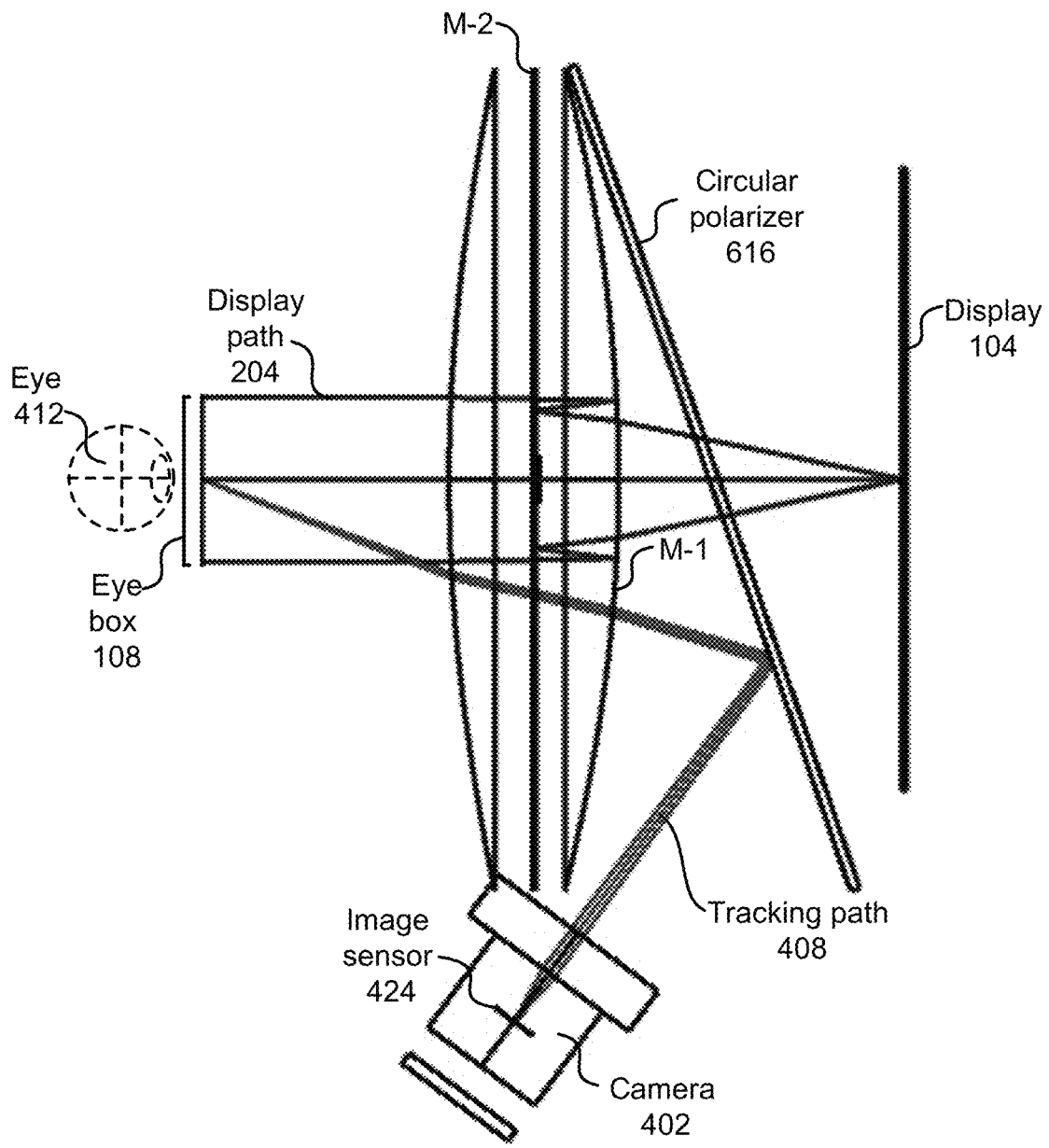
FIG. 6 illustrates a ray tracing diagram of an embodiment of an eye-tracking system with a circular reflective polarizer.

Another possible solution to reduce ghost images is to use a reflective, circular polarizer. FIG. 6 illustrates a ray tracing diagram of an embodiment of an eye-tracking system with circular polarizer 616 used as reflector 416 to direct light to the camera 402 for eye tracking. The circular polarizer 616 is a reflective, circular polarizer. In some embodiments, the circular polarizer 616 is a narrow band polarizer (e.g., having a reflection bandwidth equal to or less than 20, 30, 40, or 70 nm, and/or equal to or greater than 5, 10, or 20 nm). The circular polarizer 616 can have a short-wavelength limit. A short-wavelength limit is the shortest wavelength that is reflected at half the maximum reflectance of the circular polarizer 616. A high-wavelength limit is the longest wavelength that is reflected at half the maximum reflectance of the circular-polarizer 616. Reflection bandwidth of the circular polarizer 616 is measured between the short-wavelength limit and the high-wavelength limit. In some embodiments, the circular polarizer 616 is a high-pass reflector, meaning high frequencies (low wavelengths) are passed and low frequencies (high wavelengths) are reflected (e.g., a high-pass reflector can have a short-wavelength limit and no high-wavelength limit). In some embodiments, reflection of the circular polarizer 616 is matched with the display 104. For example, the short-wavelength limit of the circular polarizer 616 is configured to be at a longer wavelength than a spectrum of light of the display 104 (e.g., where the spectrum of light of the display 104 is measured as full-width at half-maximum of light emitted by the display 104). In some embodiments, the short-wavelength limit of the circular polarizer 616 is longer than the longest wavelength of light emitted by the display 104. The short-wavelength limit of the circular polarizer 616 can be equal to or greater than 680, 700, 720, or 750 nm and/or equal to or less than 800, 1000, or 2000 nm. The circular polarizer 616 reflects one circular polarization (e.g., right-handed, circularly-polarized light) and passes an orthogonal circular polarization (e.g., left-handed, circularly-polarized light). Unlike reflection from a metallic mirror where circular polarization changes handedness, reflection from the circular polarizer 616 maintains handedness of the circular polarization upon reflection (e.g., the circular polarizer 616 is made using a cholesteric liquid crystal).

Light from an eye 412 of the user traveling away from the eye 412 passes through the second mirror M-2 (e.g., a reflective, linear polarizer with a transmission axis aligned with the x-axis) and is linearly polarized (e.g., p-polarized). After passing through the second mirror M-2, light passes through the optical retarder 120. The optical retarder 120 is a quarter-wave plate having a fast axis oriented at 135⁰ from the x-axis. P-polarized light passing through the optical retarder 120 will be converted to right-handed, circularly-polarized light (RHC). The right-handed, circularly-polarized light will be reflected by the circular polarizer 616.

Light is not transmitted to the camera 402 on the first ghost path 404-1 because light reflecting from the circular polarizer 616 back toward the first mirror M-1 (which is RHC) is reflected by the first mirror M-1 as left-handed, circularly-polarized light and propagates towards the circular polarizer 616. The left-handed, circularly-polarized light then passes through the circular polarizer 616 and is not deflected by the circular polarizer 616 toward the camera 402.

Light is not transmitted to the camera 402 on the second ghost path 404-2 because light reflecting from the first mirror M-1 back toward the optical retarder 120 will be converted to left-handed, circularly-polarized light. Left-handed, circularly-polarized light traveling in the z-direction will be converted to p-polarized light; reflected by the second mirror M-2 to propagate in the negative z-direction; pass back through the optical retarder 120; and be converted to left-handed, circularly-polarized light traveling toward first mirror M-1. Left-handed, circularly-polarized light traveling toward the first mirror M-1 will be partially transmitted and partially reflected. Partially reflected light will be transmitted back through the reflective polarizer 116 (M-2) as described in FIG. 2. Partially transmitted light will be transmitted as left-handed, circularly-polarized light, which will pass through the circular polarizer 616 and not be directed toward the camera 402.

Figure 7:
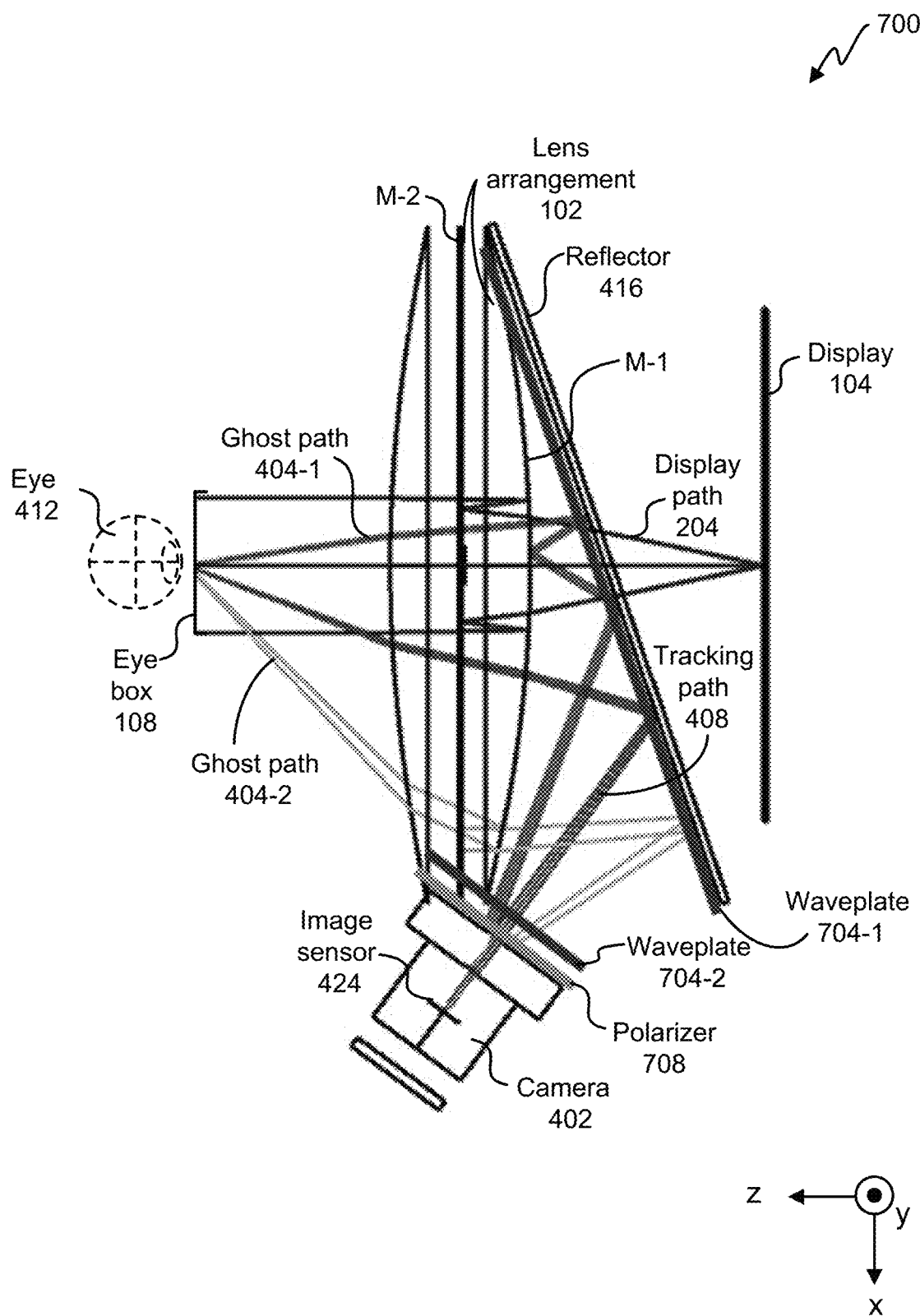
FIG. 7 illustrates a ray tracing diagram of an embodiment of an eye-tracking system for the lens arrangement.

Another possible solution to reduce ghost images is to use a waveplate. FIG. 7 illustrates a ray tracing diagram of an embodiment of a system 700 for eye tracking with folded optics. The system 700 comprises the lens arrangement 102 for focusing light from the display 104 to the eye 412 of a user (e.g., to the eye box 108); the camera 402; a reflector 416, wherein the reflector 416 is configured to direct a portion of light to the camera 402 after the portion of light passes through the lens arrangement 102; a first waveplate 704-1, wherein the first waveplate 704-1 is between the lens arrangement 102 and the reflector 416; a second waveplate 704-2, wherein the second waveplate 704-2 is between the reflector 416 and the camera 402; and a polarizer 708, wherein the polarizer 708 is between the second waveplate 704-2 and the camera 402. The lens arrangement 102 comprises the first mirror M-1 and the second mirror M-2.

The reflector 416 can be a hot mirror (e.g., reflecting infrared light and passing visible light). By adding the first waveplate 704-1, the second waveplate 704-2, and the polarizer 708 to the configuration shown in FIG. 4, ghost paths 404 can be reduced and/or eliminated.

In some embodiments, the first waveplate 704-1 is a first quarter-wave plate, the second waveplate 704-2 is a second quarter-wave plate, and/or the polarizer 708 is a linear polarizer (e.g., an absorptive polarizer). The first quarter-wave plate is clocked by 90 degrees from the second quarter-wave plate. The first quarter-wave plate is clocked by 90 degrees from the optical retarder 120 (e.g., the first waveplate 704-1 has a fast axis oriented by about 45 degrees with respect to the x-axis). In some embodiments, the first waveplate 704-1 is the waveplate 208 in FIG. 2. The polarizer 708 is an absorptive, linear polarizer with a transmission axis aligned horizontally, to pass p-polarized light.

Light from the display 104 travels along the display path 204 to the eye box 108. Light reflections off the eye 412 travel along the tracking path 408 to the camera 402 and are imaged by the image sensor 424. Light reflected from the eye 412 traveling along a ghost path 404 is attenuated by the polarizer 708.

Figure 8:
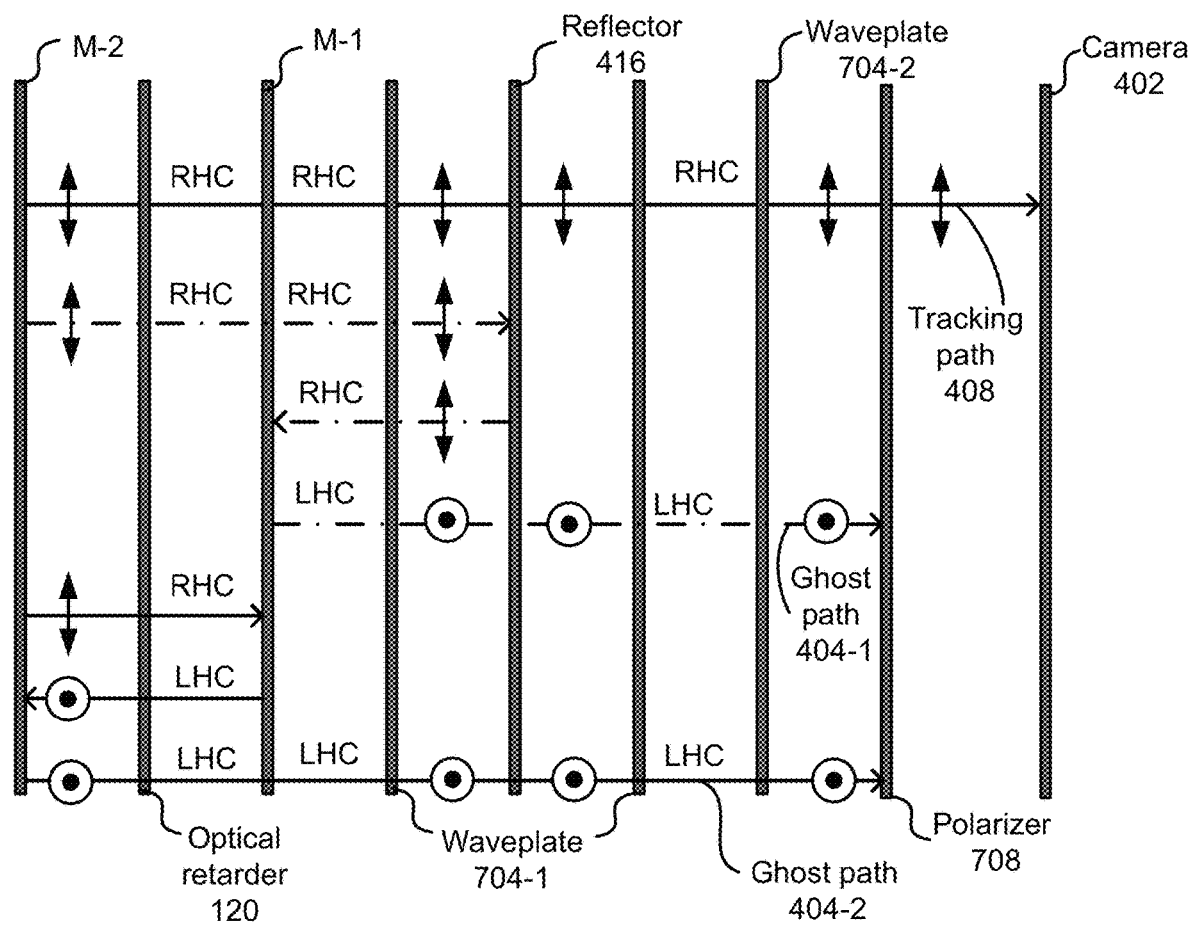
FIG. 8 depicts a schematic of optical paths of an eye-tracking system with the lens arrangement.
Figure 8:

FIG. 8 depicts a schematic of optical paths of an eye-tracking system 700. In FIG. 8, polarization states of light along the tracking path 408, the first ghost path 404-1, and the second ghost path 404-2 are shown. The y-axis (vertical axis) is into and out of the page.

For the tracking path 408, light is transmitted through the second mirror M-2 and p-polarized light because the second mirror M-2 is a linear, reflective polarizer 116 with a horizontal transmission axis. P-polarized light traveling from the second mirror M-2 and through the optical retarder 120 will be changed to right-handed, circularly-polarized (RHC) light. After passing through the optical retarder 120, light will pass through the first mirror M-1, without changing polarization. After passing through the first mirror M-1, light passes through the first waveplate 704-1 and is changed back to p-polarized light. P-polarized light is then reflected as p-polarized light by the reflector 416, passes back through the first waveplate 704-1, and is converted back to right-handed circularly-polarized light. After passing through the first waveplate 704-1 a second time, light passes through the second waveplate 704-2 and is converted to p-polarized light. The p-polarized light, after passing through the second waveplate 704-2, passes through the polarizer 708 and to the camera 402, because p-polarized light is aligned with the transmission axis of the polarizer 708.

For the first ghost path 404-1, light is transmitted through the second mirror M-2 and p-polarized because the second mirror M-2 is a linear, reflective polarizer 116 with a horizontal transmission axis. P-polarized light traveling from the second mirror M-2 and through the optical retarder 120 will be changed to right-handed, circularly-polarized light. After passing through the optical retarder 120, light will pass through the first mirror M-1, without changing polarization. After passing through the first mirror M-1, light passes through the first waveplate 704-1 and is changed back to p-polarized light. P-polarized light is then reflected as p-polarized light by the reflector 416, passed back through the first waveplate 704-1 and converted back into right-handed circularly-polarized light. After passing through the first waveplate 704-1 a second time, light is transmitted back toward the first mirror M-1 and reflects off the first mirror M-1 as left-handed, circularly-polarized (LHC) light. Left-handed, circularly-polarized light traveling from the first mirror M-1 toward the first waveplate 704-1 will be changed to s-polarized light by passing through the first waveplate 704-1. S-polarized light is then reflected as s-polarized light by the reflector 416, passed back through the first waveplate 704-1, and converted to left-handed circularly-polarized light. Left-handed, circularly-polarized light passing through the second waveplate 704-2 toward the camera 402 will be changed to s-polarized light and blocked by the polarizer 708 because the polarizer 708 transmits p-polarized light and blocks s-polarized light.

For the second ghost path 404-2, light is transmitted through the second mirror M-2 and p-polarized because the second mirror M-2 is a linear, reflective polarizer 116 with a horizontal transmission axis. P-polarized light traveling from the second mirror M-2 and through the optical retarder 120 will be changed to right-handed, circularly-polarized light. After passing through the optical retarder 120, light is reflected as left-handed circularly-polarized light by the first mirror M-1, back toward the second mirror M-2. Left-handed, circularly polarized light traveling in the z-direction changes into s-polarized light after passing through the optical retarder 120, is reflected by the second mirror M-2 as s-polarized light, and converted back into left-handed, circularly-polarized light traveling in a negative z-direction. Left-handed, circularly-polarized light passes through the first mirror M-1 as left-handed, circularly-polarized light. Left-handed, circularly-polarized traveling from the first mirror toward the first waveplate 704-1 will be changed to s-polarized light by passing through the first waveplate 704-1. S-polarized light is then reflected as s-polarized light by the reflector 416, passed back through the first waveplate 704-1, and converted to left-handed circularly-polarized light. Left-handed, circularly-polarized light passing through the second waveplate 704-2 toward the camera 402 will be changed to s-polarized light and blocked by the polarizer 708 because the polarizer 708 transmits p-polarized light and blocks s-polarized light. Thus the first waveplate 704-1, the second waveplate 704-2, and the polarizer 708 block ghost paths 404 while allowing light from the tracking path 408 to enter the camera 402.

Figure 9:
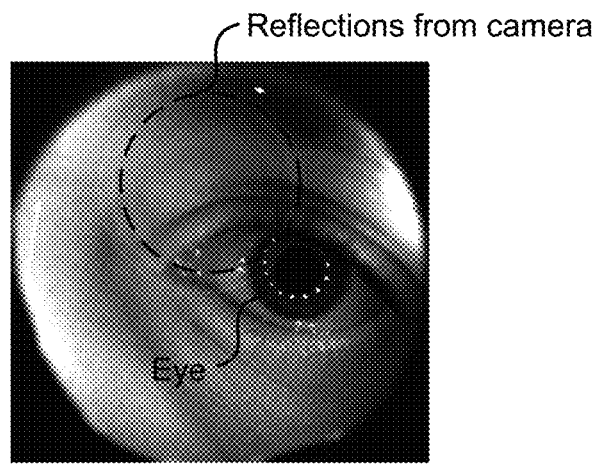
FIG. 9 is a picture of a *Narcissus* effect of a camera.

FIG. 9 is a picture of the *Narcissus* effect. The *Narcissus* effect is the camera "seeing" itself based on reflections from the camera. To reduce the *Narcissus* effect, a third waveplate is placed between the polarizer 708 and the camera 402.

Figure 10:
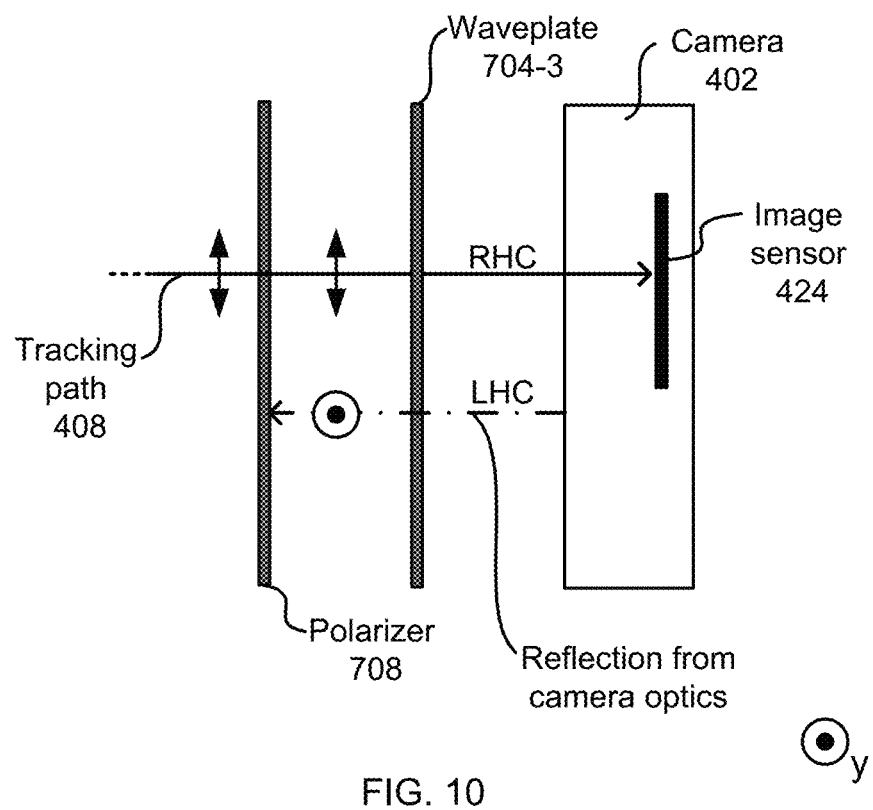
FIG. 10 depicts a schematic of an optical path of an eye-tracking system for reducing the *Narcissus* effect.

FIG. 10 depicts a schematic of an optical path of an eye-tracking system for reducing the *Narcissus* effect. To reduce the *Narcissus* effect, a third waveplate 704-3 is placed between the polarizer 708 and the camera 402. Referring back to FIG. 8, p-polarized light travels from the second waveplate 704-2 toward the polarizer 708 and is passed by the polarizer 708. FIG. 10 depicts the polarizer 708 and the camera 402 from FIG. 8. FIG. 10 further depicts the third waveplate 704-3 between the polarizer 708 and the camera 402. The third waveplate 704-3 has a fast axis oriented +/−45 degrees with respect to the transmission axis of the polarizer 708. Taking the example of the fast axis being clocked similarly as the first waveplate 704-1, p-polarized light is changed into right-handed, circularly-polarized light by passing through the third waveplate 704-3. A first part of the right-handed, circularly-polarized light will pass through camera optics and be detected by the image sensor 424. A second part of the right-handed, circularly-polarized light transmitted from the third waveplate 704-3 will be reflected by camera optics (e.g., a surface of a lens of the camera 402) back toward the third waveplate 704-3 as left-handed, circularly-polarized light. Reflected left-handed, circularly-polarized light from the camera optics changes to s-polarized light by passing through the third waveplate 704-3 and blocked by the polarizer 708. Thus reflections from camera optics are attenuated by inserting the third waveplate 704-3 between the polarizer 708 and the camera 402.

Figure 11:
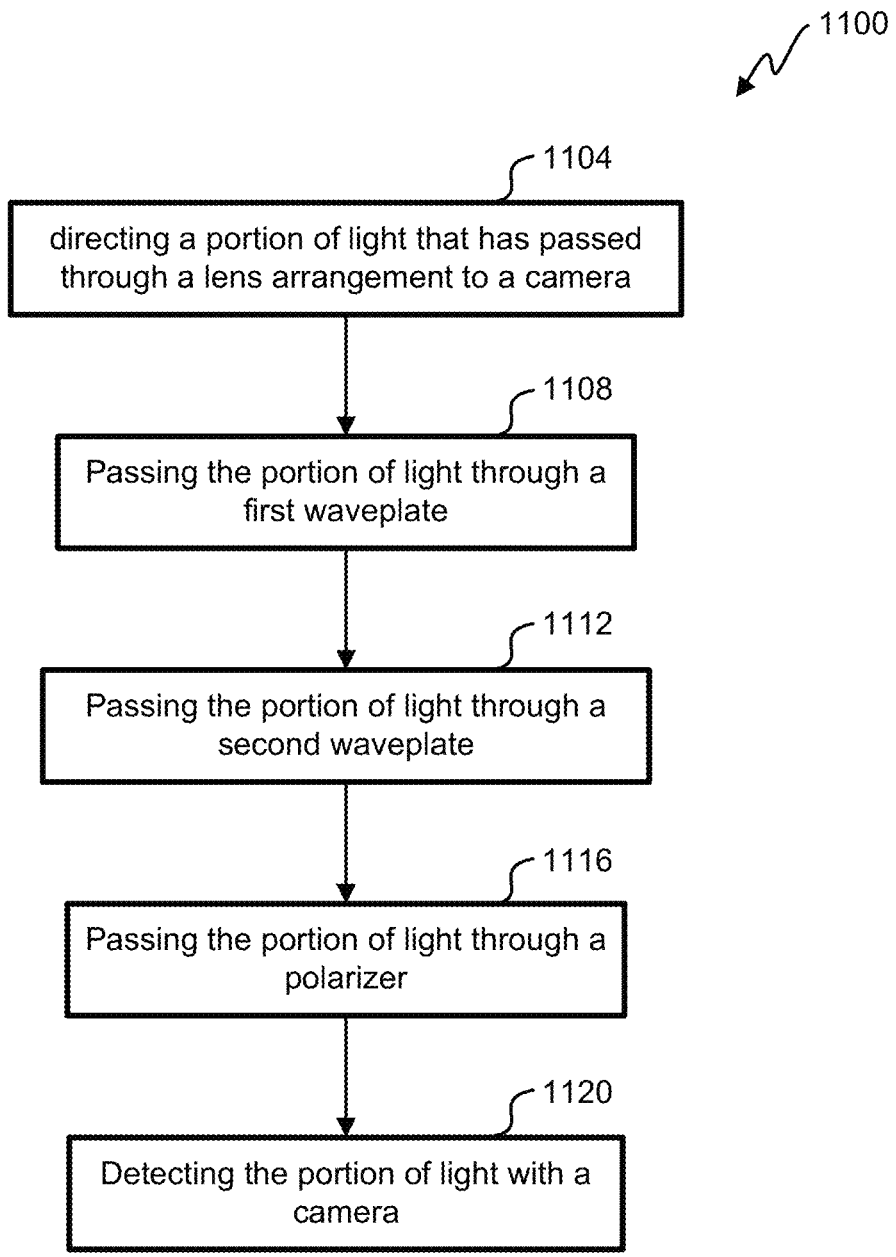
FIG. 11 illustrates an embodiment of a flowchart of a process for using an eye-tracking system with a pancake lens.

FIG. 11 illustrates an embodiment of a flowchart of a process 1100 for using an eye-tracking system with the lens arrangement 102. Process 1100 begins in step 1104 with directing a portion of light to the camera 402, using a reflector 416, after the portion of light passes through the lens arrangement 102 and the first waveplate 704-1, wherein the lens arrangement 102 comprises the first mirror M-1 and the second mirror M-2. The portion of light can be a reflection from an eye of a user. The portion of light is passed through the first waveplate, step 1108, after directing the portion of light with the reflector 416. In step 1112, the portion of light is passed through the second waveplate 704-2, wherein the second waveplate 704-2 is between the reflector 416 and the camera 402. After passing through the second waveplate 704-2, the portion of light is passed through the polarizer 708, step 1116. After passing through the polarizer 708, the portion of light is detected by the camera 402 (e.g. using the image sensor 424), step 1120. The camera 402 is configured to capture images of the eye of the user; and a controller is configured to track a position of the eye of the user base on images of the eye captured by the camera. In some configurations, the process 100 further comprises passing the portion of light through the third waveplate 704-3, after passing the portion of light through the second waveplate 704-2 and before detecting the portion of light with the camera 402.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
    a lens arrangement for focusing light from a display to an eye of a user, the lens arrangement comprising:
        a first mirror; and
        a second mirror;
    a camera;
    a reflector, wherein the reflector is configured to direct a portion of light to the camera after the portion of light passes through the lens arrangement;
    a first waveplate, wherein the first waveplate is between the lens arrangement and the reflector;
    a second waveplate, wherein the second waveplate is between the reflector and the camera; and
    a polarizer, wherein the polarizer is between the second waveplate and the camera.

2. The system of claim 1, further comprising a third waveplate, wherein the third waveplate is between the polarizer and the camera.

3. The system of claim 2, wherein a fast axis of the third waveplate is at 45 degrees to a transmission axis of the polarizer.

4. The system of claim 1, wherein:
    the first mirror is a partial reflector; and
    the second mirror is a reflective polarizer.

5. The system of claim 4, wherein the reflective polarizer is a linear polarizer.

6. The system of claim 1, wherein:
    the lens arrangement further comprises an optical retarder;
    the optical retarder is a quarter-wave plate; and
    the optical retarder is between the first mirror and the second mirror.

7. The system of claim 1, wherein:
    the camera is configured to capture images of the eye of the user; and
    the system further comprises a controller configured to track a position of the eye of the user based on images of the eye captured by the camera.

8. The system of claim 1, wherein the polarizer is an absorptive polarizer.

9. The system of claim 1, wherein the first mirror is on a curved surface for focusing light from the display to the eye of the user.

10. The system of claim 1, wherein the portion of light is from a reflection from the eye of the user.

11. A method comprising:
    directing a portion of light to a camera, using a reflector, after the portion of light passes through a lens arrangement and a first waveplate, wherein the lens arrangement comprises a first mirror and a second mirror;
    passing the portion of light through the first waveplate, after directing the portion of light with the reflector;
    passing the portion of light through a second waveplate, wherein the second waveplate is between the reflector and the camera;
    passing the portion of light through a polarizer, wherein the polarizer is between the second waveplate and the camera; and
    detecting the portion of light with the camera, after the portion of light passes through the polarizer.

12. The method of claim 11, further comprising passing the portion of light through a third waveplate, after passing the portion of light through the second waveplate and before detecting the portion of light with the camera.

13. The method of claim 11, wherein:
the first mirror is a partial reflector;
the second mirror is a reflective polarizer; and
the reflective polarizer is a linear polarizer.

14. The method of claim 11, wherein:
the lens arrangement further comprises an optical retarder; and
the optical retarder is between the first mirror and the second mirror.

15. The method of claim 11, wherein the portion of light is from a reflection from an eye of a user.

16. The method of claim 11, further comprising tracking a position of an eye based on detecting the portion of light with the camera.

* * * * *